(12) United States Patent
Chu et al.

(10) Patent No.: US 9,233,521 B2
(45) Date of Patent: Jan. 12, 2016

(54) TIN WHISKER MITIGATION MATERIAL USING THIN FILM METALLIC GLASS UNDERLAYER

(71) Applicant: National Taiwan University of Science and Technology, Taipei (TW)

(72) Inventors: Jinn Chu, Taipei (TW); I Made Wahyu Diyatmika, Taipei (TW); Yee-Wen Yen, Taipei (TW); Wen-Zhi Chang, Taipei (TW)

(73) Assignee: National Taiwan University Of Science And Technology (TW)

( * ) Notice: Subject to any disclaimer, the term of this patent is extended or adjusted under 35 U.S.C. 154(b) by 205 days.

(21) Appl. No.: 14/012,992

(22) Filed: Aug. 28, 2013

(65) Prior Publication Data

US 2014/0370328 A1    Dec. 18, 2014

(30) Foreign Application Priority Data

Jun. 14, 2013   (TW) .............................. 102121084 A

(51) Int. Cl.
  *B32B 15/00*   (2006.01)
  *B32B 15/01*   (2006.01)
  *C22C 45/10*   (2006.01)

(52) U.S. Cl.
  CPC ............... *B32B 15/01* (2013.01); *B32B 15/013* (2013.01); *B32B 15/018* (2013.01); *C22C 45/10* (2013.01); *Y10T 428/12708* (2015.01); *Y10T 428/12715* (2015.01); *Y10T 428/12722* (2015.01)

(58) Field of Classification Search
  USPC .................................................. 428/646–648
  See application file for complete search history.

(56) References Cited

U.S. PATENT DOCUMENTS

| | | | | |
|---|---|---|---|---|
| 2002/0192492 | A1* | 12/2002 | Abys et al. ..................... | 428/647 |
| 2003/0042597 | A1* | 3/2003 | Kusukawa et al. ............. | 257/693 |
| 2005/0056446 | A1* | 3/2005 | Ogawa .......................... | 174/52.1 |
| 2008/0128055 | A1* | 6/2008 | Chu et al. ...................... | 148/518 |

OTHER PUBLICATIONS

Diyatmika et al., "Thin film metallic glass as an underlayer for tin whisker mitigation: a room temperature evaluation", Aug. 16, 2013, Thin Solid Films, vol. 561, pp. 93-97.*

* cited by examiner

*Primary Examiner* — Humera Sheikh
*Assistant Examiner* — Lucas Wang

(57) ABSTRACT

The present invention relates to a tin whisker mitigation material using thin film metallic glass underlayer, which is a thin film metallic glass (TFMG) formed between a metal substrate and a tin layer. Particularly, the TFMG can be a $Zr_{46}Ti_{26}Ni_{28}$ underlayer or a $Zr_{51.7}Cu_{32.3}Al_9Ni$ underlayer, capable of blocking off the interaction occurring in the interface of a copper layer (the metal substrate) and the tin layer, so as to carry out the inhibition of tin whisker growth. Moreover, a variety of experiment data are proposed for proving that the TFMG of the $Zr_{46}Ti_{26}Ni_{28}$ or the $Zr_{51.7}Cu_{32.3}Al_9Ni$ can indeed be used to replace the conventionally used thick tin layer for being the underlayer between the copper layer (the metal substrate) and the tin layer, and then effectively inhibit the interaction occurring in the Cu/Sn interface and the growth of tin whisker by low manufacturing cost way.

1 Claim, 7 Drawing Sheets

1

TIN WHISKER MITIGATION MATERIAL USING THIN FILM METALLIC GLASS UNDERLAYER

BACKGROUND OF THE INVENTION

1. Field of the Invention

The present invention relates to lead-free soldering technology electronics, and more particularly to a tin whisker mitigation material using thin film metallic glass underlayer.

2. Description of the Prior Art

Currently, electronics packaging technology mainly uses copper or iron-nickel alloy as a conductive lead frame for electrically connecting chips and printed circuit board (PCB). However, because both the copper lead frame and the iron-nickel lead frame cannot join with the PCB well, a solder-plating layer is coated on the surface of the lead frame for enhancing the connection of the lead frame and the PCB.

The solder-plating layer is traditionally made of tin-lead alloy, and has been replaced by lead-free solder because the lead (Pb) is an unrecyclable toxic material. However, lead-free solder would spontaneously produce tin whisker under room temperature; moreover, when the tin whisker is produced to include a specific length, the tin whisker may connect to the two adjacent solder pins in a packaged electronic component, and then causes the two adjacent solder pins to short. Besides, when the length of the produced tin whisker is almost equal to the space of the two adjacent solder pins, the point discharge may occur and produce spark to fail the packaged electronic component.

Accordingly, a method for inhibiting the growth of tin whisker is proposed. Referring to FIG. 1, which illustrates a flow chart of a conventional method for inhibiting the growth of tin whisker; moreover, please simultaneously refer to FIG. 2, there is shown a side cross-sectional view of a multi-layer structure fabricated by using the method. The method for inhibiting the growth of tin whisker mainly includes 3 steps.

As shown in FIG. 1 and FIG. 2, the method is firstly proceeded to step (S01'), providing an iron-nickel alloy substrate 202', wherein the weight percent of the nickel in the iron-nickel alloy substrate 202' is ranged from 42 wt % to 60 wt %. Next, the step (S02') is executed for forming a nickel layer 204' on the surface of the iron-nickel alloy substrate 202', and the thickness of the nickel layer 204' is ranged from 1 μm to 2 μm. Finally, the method is proceeded to step (S03'), forming a tin layer 206' on the nickel layer 204', and the thickness of the tin layer 206' is ranged from 3 μm to 20 μm. Thus, the stress in the internal of the tin layer 206' can be prevented by the nickel layer 204', therefore the growth of tin whisker would be further inhibit, so as to prevent the tin whisker growing on the surface of the tin layer 206'.

The above-mentioned method can indeed effectively inhibit the growth of tin whisker by way of forming an electroplated nickel layer 204' with the thickness of 3 μm-20 μm as an underlayer between the Cu/Sn interface. However, it needs to further concern the issues brought by the above-mentioned method are that: (1) the waste produced by the electroplating process is harmful to environment; and (2) the 20 μm electroplated nickel layer 204' would increase the manufacturing method of the electronics package.

Thus, through above descriptions, it is able to know that conventional method for inhibiting the growth of tin whisker still includes drawbacks and shortcomings, so that the inventor of the present application has made great efforts to make inventive research thereon and eventually provided a tin whisker mitigation material using thin film metallic glass underlayer.

SUMMARY OF THE INVENTION

The primary objective of the present invention is to provide a tin whisker mitigation material using thin film metallic glass underlayer, which is an amorphous thin film metallic glass (TFMG), and can be used to replace the conventionally used thick tin layer for being the underlayer between a copper layer (i.e., a metal substrate) and a tin layer, so as to effectively inhibit the interaction occurring in the Cu/Sn interface and the growth of tin whisker by low manufacturing cost way.

Accordingly, to achieve the primary objective of the present invention, the inventors propose a tin whisker mitigation material using thin film metallic glass underlayer, which is a thin film metallic glass (TFMG) formed between a metal substrate and a tin layer; wherein the amorphous TFMG is used as an underlayer of the metal substrate and the tin layer, so as to prevent the interaction occurring in the interface of the metal substrate and the tin layer and inhibit the growth of tin whisker.

For the above-mentioned tin whisker mitigation material, the thin film metallic glass (TFMG) is a zirconium-based metallic glass constituted by a zirconium (Zr) element, a titanium (Ti) element and nickel (Ni) element under a specific atomic percentage; moreover, the thickness of the TFMG is ranged from 0.05 μm to 0.2 μm.

Moreover, for the above-mentioned tin whisker mitigation material, the zirconium-based metallic glass is constituted by the zirconium element, the titanium (Ti) element and the nickel element, and the atomic percent of the zirconium element, the titanium element and the nickel element are 46 at %, 26 at % and 28 at %, respectively.

Furthermore, for the above-mentioned tin whisker mitigation element, the zirconium-based metallic glass is constituted by the zirconium element, the copper (Cu) element, the aluminum (Al) element and the nickel element, and the atomic percent of the zirconium element, the copper element, the aluminum element and the nickel element are 51.7 at %, 32.3 at %, 9 at %, and 7 at %, respectively.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a tin whisker mitigation material using thin film metallic glass underlayer according to the present invention, embodiments of the present invention will be described in detail with reference to the attached drawings hereinafter.

Figure 1:
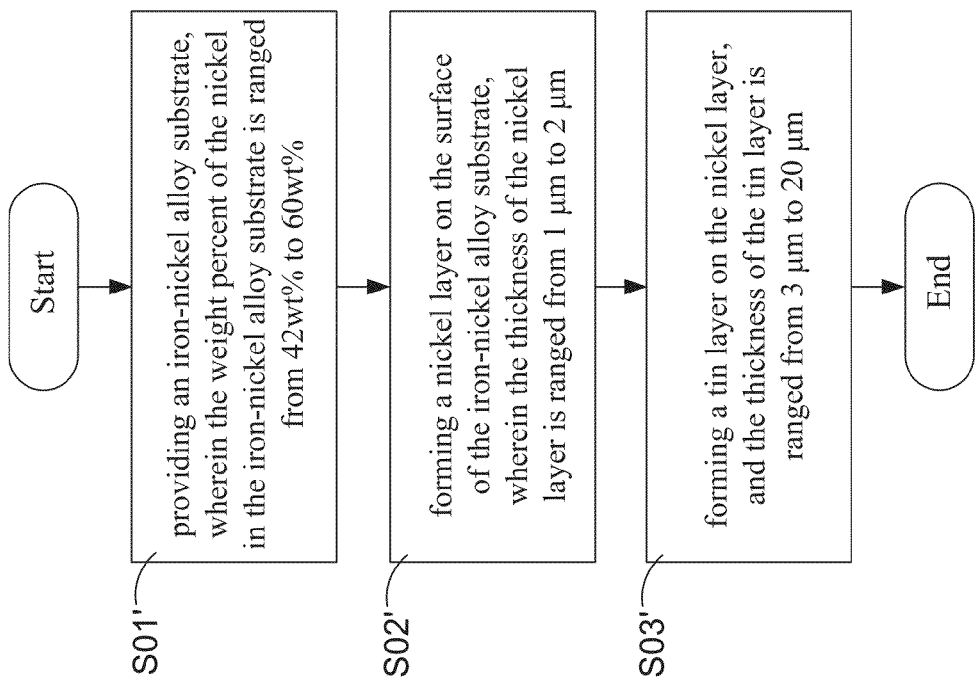
FIG. 1 is a flow chart of a conventional method for inhibiting the growth of tin whisker.
Figure 2:
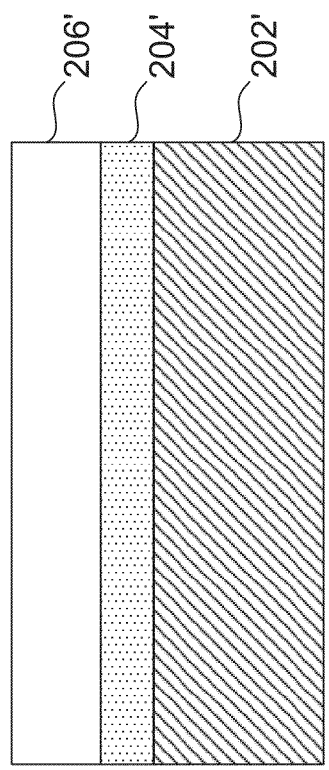
FIG. 2 is a side cross-sectional view of a multi-layer structure fabricated by using the method.
Figure 3:
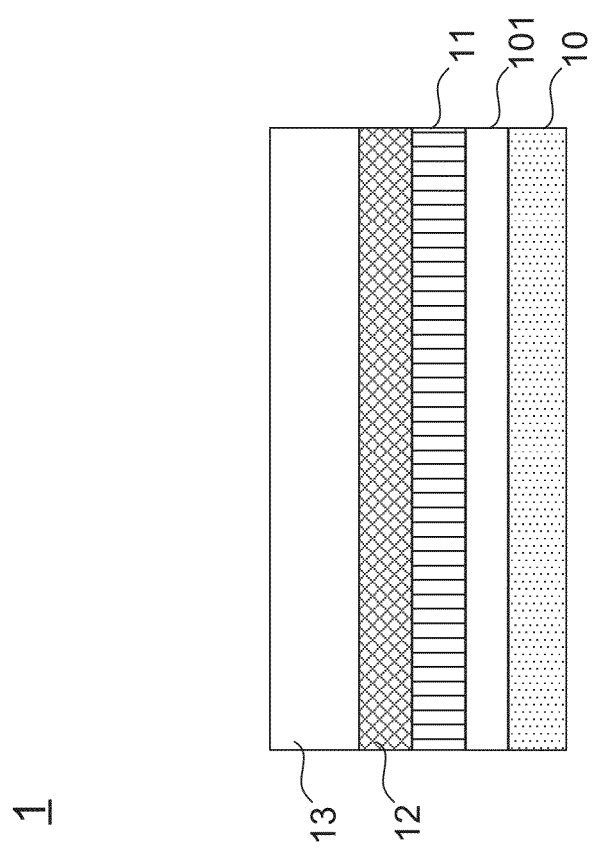
FIG. 3 is a side cross-sectional view of a tin whisker mitigation material using thin film metallic glass underlayer according to the present invention.

Please refer to FIG. 3, which illustrates a side cross-sectional view of a tin whisker mitigation material using thin film metallic glass underlayer according to the present invention. As shown in FIG. 3, the tin whisker mitigation material 1 is an amorphous thin film metallic glass (TFMG) formed between a metal substrate 11 and a tin (Sn) layer 13. In the present invention, the amorphous TFMG is used as an underlayer 12 of the metal substrate 11 and the tin layer 13; thus, the interaction occurring in the interface of the metal substrate 11 and the tin layer 13 would be prevented by the underlayer 12; and simultaneously, the growth of tin whisker would also be effectively inhibited. Herein, it needs to note that, the embodiment of the TFMG does not be limited in the present invention. In some exemplary embodiments, the TFMG can be a zirconium-based metallic glass, a yttrium-based metallic glass, a vanadium-based metallic glass, a titanium-based metallic glass, a tantalum-based metallic glass, samarium-based metallic glass, a praseodymium-based metallic glass, a platinum-based metallic glass, a palladium-based metallic glass, a nickel-based metallic glass, a neodymium-based metallic glass, a magnesium-based metallic glass, a lanthanum-based metallic glass, a hafnium-based metallic glass, an iron-based metallic glass, a copper-based metallic glass, a cobalt-based metallic glass, a cerium-based metallic glass, a calcium-based metallic glass, a gold-based metallic glass, or an aluminum-based metallic glass.

The Zr-based metallic glass is the preferable embodiment of the present invention, which is constituted by a zirconium (Zr) element, a titanium (Ti) element and a nickel (Ni) material under a specific atomic percentage. Furthermore, the best embodiment of the TFMG is the Zr-based metallic glass constituted by the zirconium element, the titanium (Ti) element and the nickel element, in which the atomic percent of the zirconium element, the titanium element and the nickel element are 46 at %, 26 at % and 28 at %, respectively. Therefore, the TFMG underlayer 12 of $Zr_{46}Ti_{26}Ni_{28}$ is formed between the metal substrate 11 and the tin layer 13 for inhibiting the growth of tin whisker.

The TFMG further includes a second best embodiment, and the second best embodiment of the TFMG is the zirconium element, the copper (Cu) element, the aluminum (Al) element and the nickel element, in which the atomic percent of the zirconium element, the copper (Cu) element, the aluminum (Al) element and the nickel element are 51.7 at %, 32.3 at %, 9 at %, and 7 at %, respectively. Therefore, the TFMG underlayer 12 of $Zr_{51.7}Cu_{32.3}Al_9Ni_7$ is formed between the metal substrate 11 and the tin layer 13 for inhibiting the growth of tin whisker. Moreover, it needs to further explain that, the thickness of the TFMG underlayer 12 is ranged from 0.05 μm to 0.2 μm either the TFMG is $Zr_{46}Ti_{26}Ni_{28}$ or $Zr_{51.7}Cu_{32.3}Al_9Ni_7$, and the best thickness of the TFMG underlayer 12 is 0.1 μm.

In addition, the metal substrate 11 shown in FIG. 3 is formed on an external conductive substrate 10. It is well known that, the conductive metal substrate 11 is used as the bonding pads on a semiconductor wafer or the lead frame for electrically connecting some chips and a printed circuit board (PCB). For above reasons, the embodiment of the metal substrate 11 does not be limited in the present invention; in some exemplary embodiments, the metal substrate 11 can be a copper substrate, a copper alloy substrate, an iron substrate, an iron alloy substrate, a gold substrate, or a gold alloy substrate. Moreover, opposite to the metal substrate 11, the conductive substrate 10 can be a semiconductor wafer, a conductive lead frame or a printed circuit board (PCB). Besides, as shown in FIG. 3, an adhesion-enhancing layer 101 is usually formed between the conductive substrate 10 and the metal substrate 11 in manufacturing. For example, titanium (Ti) is usually fabricated to the adhesion-enhancing layer 101 formed between copper pads and a silicon wafer. Moreover, besides the titanium, molybdenum (Mo) or chromium (Cr) can also be fabricated to the adhesion-enhancing layer 101.

Figure 4:
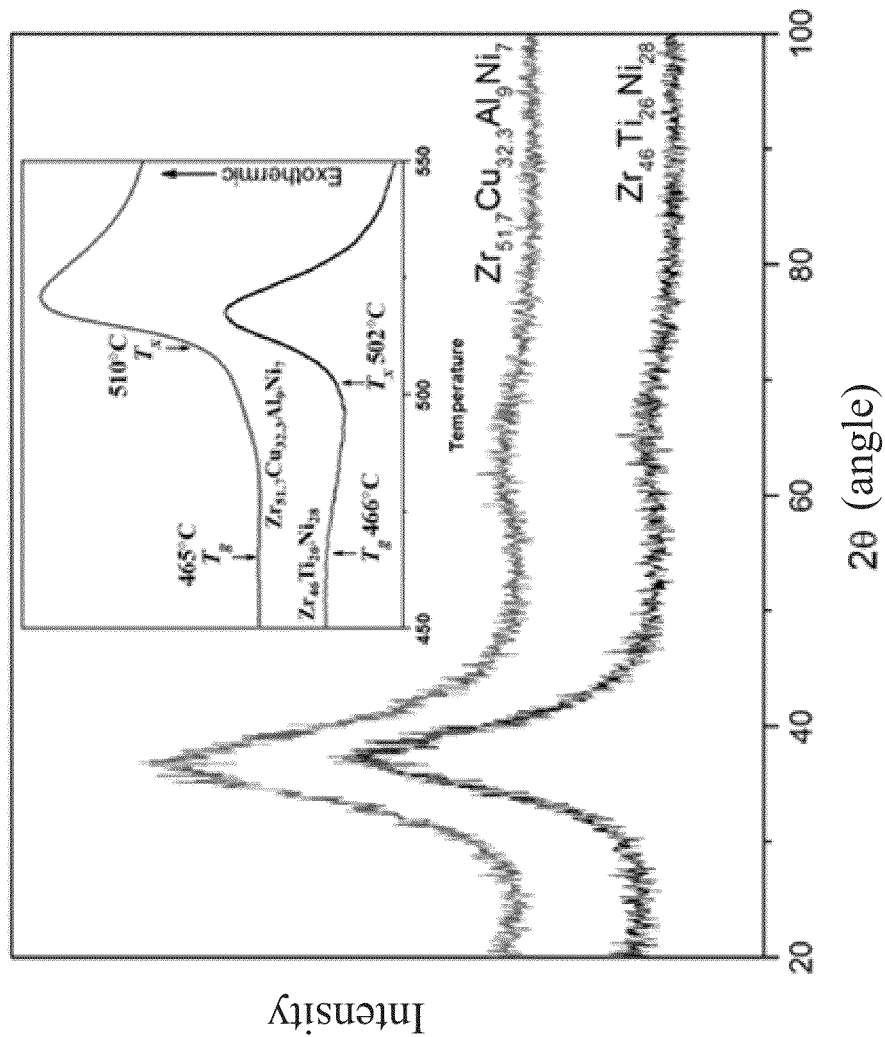
FIG. 4 is the X-ray diffraction (XRD) patterns of the tin whisker mitigation material.

Thus, through above descriptions, the frameworks, the embodiments and the properties of the tin whisker mitigation material 1 of the present invention have been completely introduced and disclosed. Next, in order to prove the practicability of the tin whisker mitigation material 1, a variety of experimental data will be presented as follows. Please refer to FIG. 4, there is shown the X-ray diffraction (XRD) patterns of the amorphous material capable of inhibiting the growth of tin whisker. As shown in FIG. 4, the XRD patterns show that the TFMG includes an amorphous structure no matter the TFMG is $Zr_{46}Ti_{26}Ni_{28}$ or $Zr_{51.7}Cu_{32.3}Al_9Ni_7$. Moreover, as shown in the embedded drawing of the FIG. 4, the DSC (Differential Scanning Calorimetry) curves reveal that the glass transition temperature (Tg) of the $Zr_{46}Ti_{26}Ni_{28}$ TFMG and the $Zr_{51.7}Cu_{32.3}Al_9Ni_7$ TFMG is respectively 466° C. and 465° C., and the crystallization temperature (Tx) thereof is 502° C. and 510° C.

Figure 5:
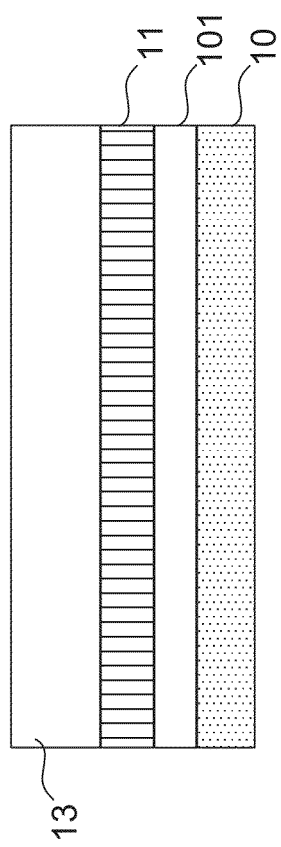
FIG. 5 is a side cross-sectional view of a metal substrate and a tin layer without any TFMG underlayer.

Referring to FIG. 3 again, and please simultaneously refer to FIG. 5, which illustrates a side cross-sectional view of a metal substrate and a tin layer without any TFMG underlayer. For comparing the difference of tin whisker growth between the material structure of metal substrate 11-TFMG underlayer 12-tin layer 13 and the material structure of metal substrate 11-tin layer 13, as shown in FIG. 5, a control material structure is made and constituted by tin layer 13, metal substrate 11, adhesion-enhancing layer 101, and external conductive layer 10. Opposite to the control material structure, an experiment material structure is made in FIG. 3.

Figure 6:
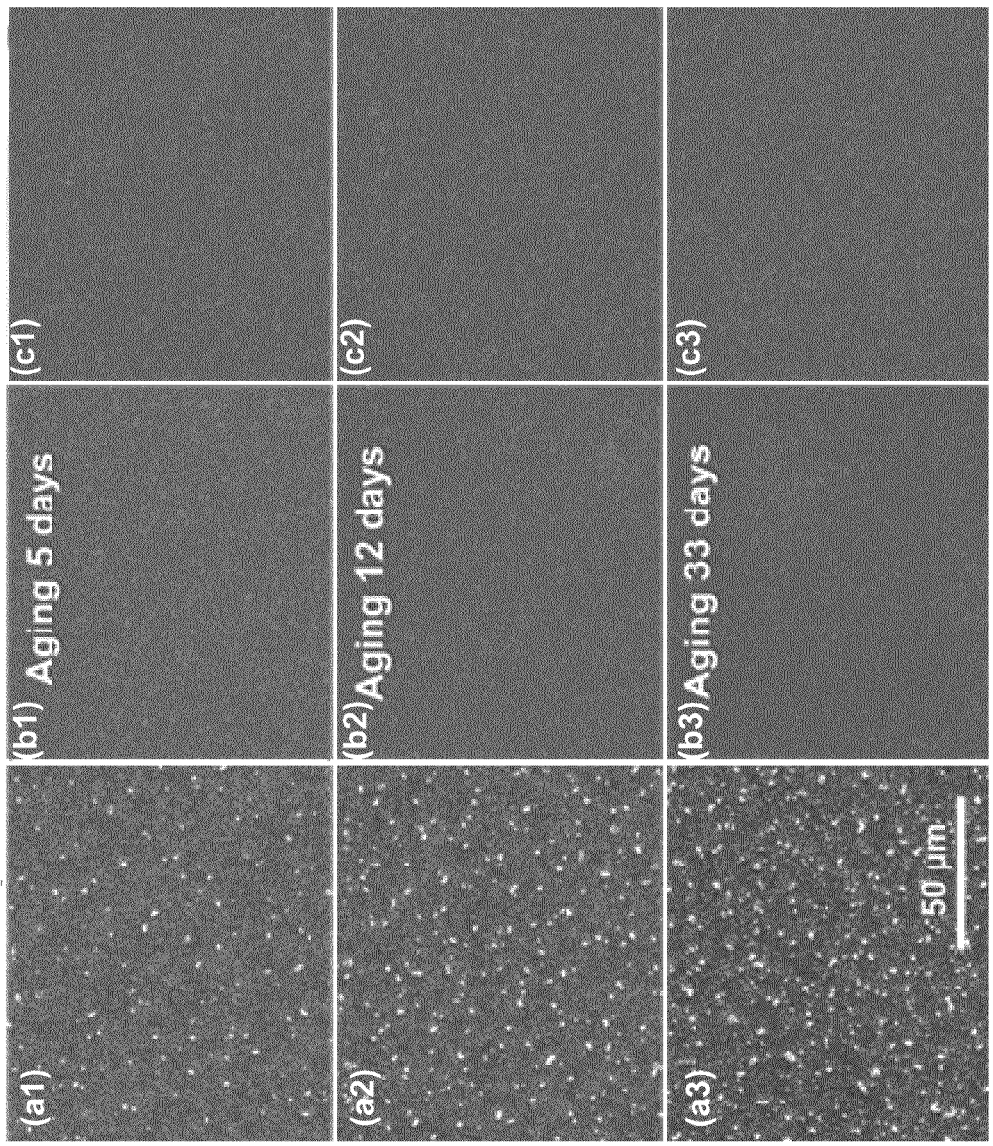
FIG. 6 is the SEM (Scanning Electron Microscopy) images of a control material structure and an experiment material structure.

Please refer to FIG. 6, there are shown SEM (Scanning Electron Microscopy) images of the control material structure and the experiment material structure. As shown in FIG. 6(a1), FIG. 6(a2) and FIG. 6(a3), an amount of tin whisker has grown on the surface of the tin layer after processing 5 days, 12 days and 33 days of aging treatment at room temperature to the control material structure. On the contrary, as shown in FIG. 6(b1), FIG. 6(b2) and FIG. 6(b3), there has no any tin whisker growing on the surface of the tin layer after processing 5 days, 12 days and 33 days of aging treatment at room temperature to the experiment material structure having the $Zr_{46}Ti_{26}Ni_{28}$ TFMG underlayer. Similarly, as shown in FIG. 6(c1), FIG. 6(c2) and FIG. 6(c3), the tin whisker does not grow on the surface of the tin layer after processing 5 days, 12 days and 33 days of aging treatment at room temperature to the experiment material structure having the $Zr_{51.7}Cu_{32.3}Al_9Ni_7$ TFMG underlayer.

Figure 7:
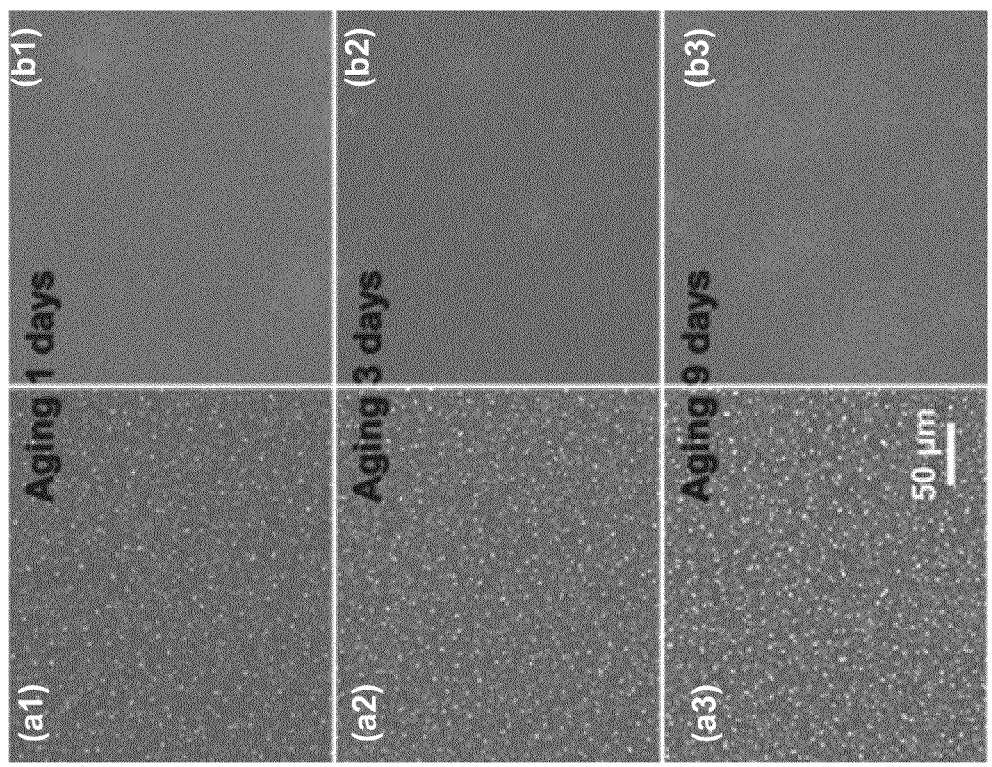
FIG. 7 is the SEM (Scanning Electron Microscopy) images of the control material structure and the experiment material structure.

In order to further prove the practicability of the tin whisker mitigation material 1, a 40° C. aging treatment is processed again. Please refer to FIG. 7, there are shown SEM images of the control material structure and the experiment material structure. As shown in FIG. 7(a1), FIG. 7(a2) and FIG. 7(a3), an amount of tin whisker has grown on the surface of the tin layer after processing 1 day, 3 days and 9 days of the 40° C. aging treatment to the control material structure. On the contrary, as shown in FIG. 7(b1), FIG. 7(b2) and FIG. 7(b3), there has no any tin whisker growing on the surface of the tin layer after processing 1 day, 3 days and 9 days of the 40° C. aging treatment to the experiment material structure having the $Zr_{46}Ti_{26}Ni_{28}$ TFMG underlayer. Similarly, as shown in FIG. 7(c1), FIG. 7(c2) and FIG. 7(c3), the tin whisker does not grow on the surface of the tin layer after processing 1 day, 3 days and 9 days of the 40° C. aging treatment to the experiment material structure having the $Zr_{51.7}Cu_{32.3}Al_9Ni_7$ TFMG underlayer.

Therefore, the above descriptions have been clearly and completely introduced the tin whisker mitigation material using thin film metallic glass underlayer of the present invention. In summary, the technology feature and the advantage thereof of the present invention is that: the 0.1 μm $Zr_{46}Ti_{26}Ni_{28}$ TFMG or the 0.1 μm $Zr_{51.7}Cu_{32.3}Al_9Ni$ TFMG proposed by the prevent invention can indeed be used to replace the conventionally used thick tin layer for being the underlayer between the copper layer (i.e., the metal substrate) and the tin layer, and then used to effectively inhibit the interaction occurring in the Cu/Sn interface and the growth of tin whisker by low manufacturing cost way.

The above description is made on embodiments of the present invention. However, the embodiments are not intended to limit scope of the present invention, and all equivalent implementations or alterations within the spirit of the present invention still fall within the scope of the present invention.

What is claimed is:

1. A tin whisker mitigation material comprising:
   a copper substrate;
   a tin layer being formed on the copper substrate; and
   a thin metallic glass layer being formed between the tin layer and the copper substrate, and used for inhibiting tin whisker growth occurring in the interface of the copper substrate and the tin layer;
   wherein the thickness of the thin metallic glass layer is 0.1 μm, and the thin metallic glass layer being a zirconium-based metallic glass composition made of a zirconium (Zr) material, a copper (Cu) material, an aluminum (Al) material and a nickel (Ni) material under a specific atomic percentage as follows: the zirconium material, the copper material, the aluminum material, and the nickel material are 51.7 at %, 32.3 at %, 9 at %, and 7 at %, respectively.

* * * * *